Figure 1:
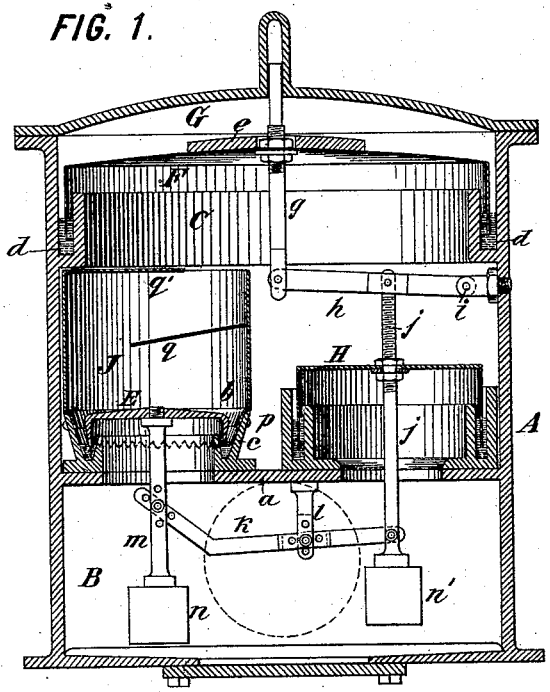

(No Model.) 3 Sheets—Sheet 1.

W. THRELKELD.
GAS PRESSURE REGULATOR.

No. 455,478. Patented July 7, 1891.

WITNESSES:
John Becker
Fred White

INVENTOR:
William Threlkeld,
By his Attorneys,
Arthur C. Fraser & Co.

(No Model.) 3 Sheets—Sheet 2.

W. THRELKELD.
GAS PRESSURE REGULATOR.

No. 455,478. Patented July 7, 1891.

WITNESSES:
John Becker
Fred White

INVENTOR:
William Threlkeld,
By his Attorneys,
Arthur E. Fraser & Co.

(No Model.) 3 Sheets—Sheet 3.

W. THRELKELD.
GAS PRESSURE REGULATOR.

No. 455,478. Patented July 7, 1891.

WITNESSES:
John Becker
Fred White

INVENTOR:
William Threlkeld,
By his Attorneys,
Arthur G. Fraser & Co.

UNITED STATES PATENT OFFICE.

WILLIAM THRELKELD, OF NEW YORK, N. Y.

GAS-PRESSURE REGULATOR.

SPECIFICATION forming part of Letters Patent No. 455,478, dated July 7, 1891.

Application filed March 17, 1890. Serial No. 344,126. (No model.)

*To all whom it may concern:*

Be it known that I, WILLIAM THRELKELD, a citizen of the United States, residing in New York city, in the county and State of New York, have invented certain new and useful Improvements in Gas-Pressure Regulators, of which the following is a specification.

This invention relates to pressure-regulating valves for securing a uniform pressure on the eduction side of the valve, notwithstanding variations occurring in the pressure on the induction side.

It relates particularly to pressure-regulators adapted for comparatively light pressures, such as are most commonly used for regulating the pressure for illuminating-gas supplied to buildings. Because of this their most frequent use such regulating-valves are generally known as "gas-pressure regulators."

Pressure-regulators have heretofore been made consisting of a cylindrical casing having inlet and outlet openings and divided interiorly by a partition separating said openings, with a valve or valves for controlling orifices in this partition and a movable diaphragm on the eduction side of the partition connected to the valve to close the same whenever the pressure exceeds a predetermined amount. In the best constructions two valves are employed moving in opposite directions in order to balance one another. The valve or valves in such regulators have been constructed with a liquid seal, the liquid used being most commonly mercury. Such mercury-sealed valves are especially well suited to this purpose, since they afford a joint which, when the valve is closed, is perfectly tight with the low pressures that are used; they require no packing, fitting, or nice finishing; are cheap to construct, and do not get out of order or deteriorate in use except in one respect—namely, that it has been found that especially when the gas passes through under a higher pressure than that usually employed the displaced mercury is, to a slight extent, thrown into spray, and the minute globules or particles of mercury are carried over out of the cup or receptacle for holding the mercury seal, so that in the course of time the quantity of mercury remaining is insufficient to properly seal the valve. This difficulty is encountered most frequently in regulators placed near the source of supply where the pressure is highest, the spraying in regulators placed in the buildings of the consumers being ordinarily so very slight that several years will elapse before the mercury will be sufficiently displaced to prevent the proper sealing of the valves.

My present invention is designed to overcome the difficulty thus noted. To this end my invention provides means for recovering from the outflowing stream of gas after it has passed the valve any particles of mercury that may have been carried up with it and for conducting back these particles and directing them into the mercury seal. For accomplishing this purpose I arrange on the eduction side of the valve a hood having preferably a somewhat circuitous passage through it to facilitate the disengagement of the minute particles of mercury which fall into the hood, and, running down through it, rejoin the bath of mercury beneath.

My invention involves also some changes in the construction of gas-pressure regulators, in order to communicate movement from the diaphragm or regulating-float in the eduction-chamber to the valve without passing any movable connection through the mercury-recovering hood.

Figure 2:
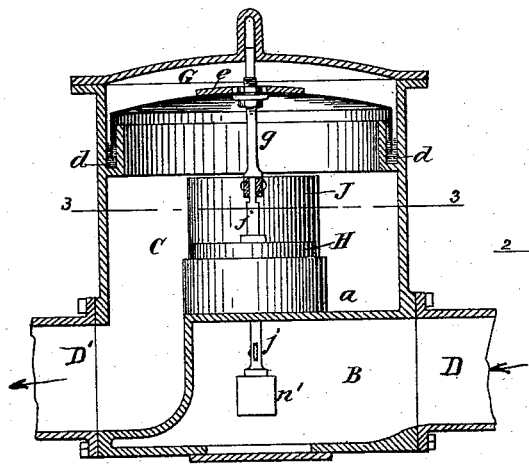
Figure 3:
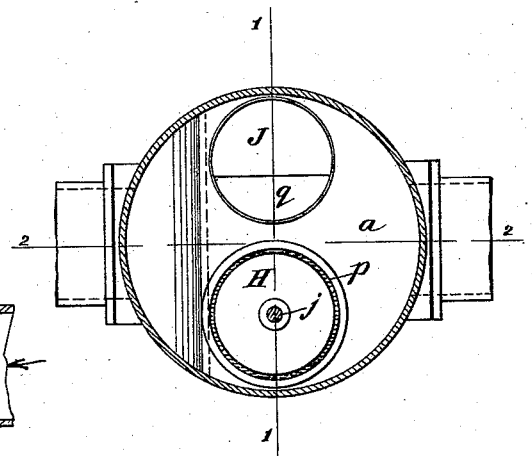
Figure 4:
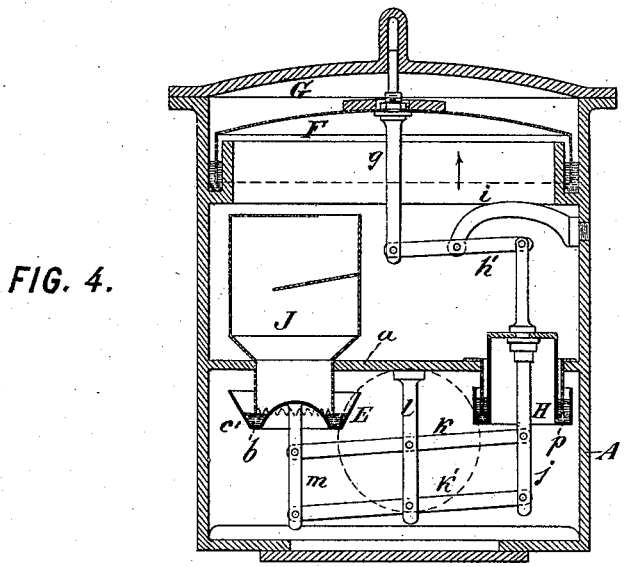
Figure 5:
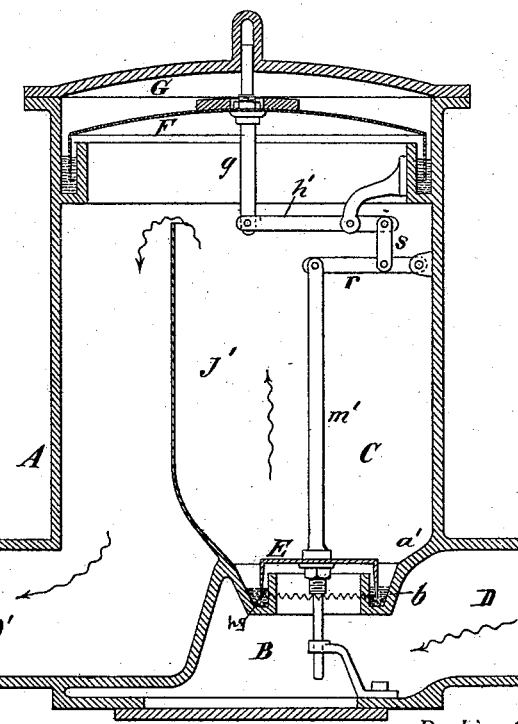
Figure 6:
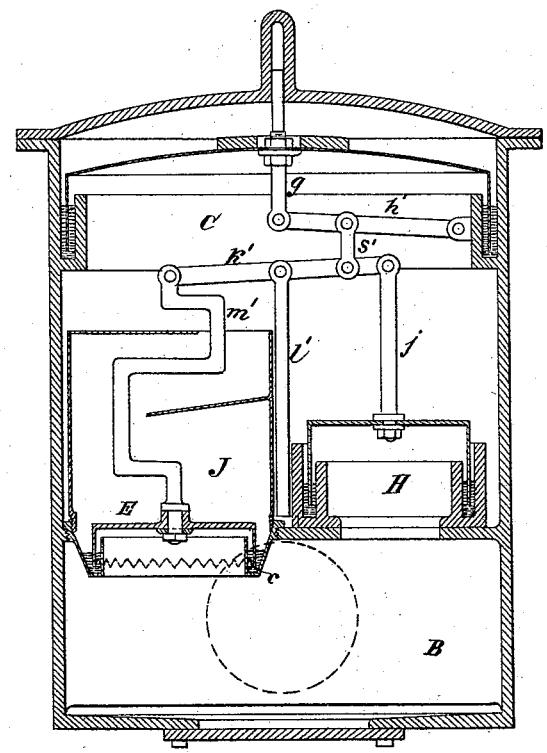

Figure 1 of the accompanying drawings is a vertical mid-section of a gas-pressure regulator constructed according to my invention. Fig. 2 is a vertical section thereof in a plane at right angles to Fig. 1, being in line with the gas-pipes. Fig. 3 is a horizontal section cut on the line 3 3 in Fig. 2. Fig. 4 is a section similar to Fig. 1, but showing a modified construction. Figs. 5 and 6 are similar views showing two other modifications.

Referring to Figs. 1, 2, and 3, let A designate the casing of the regulator, $a$ the partition therein dividing it into two chambers, an induction-chamber B beneath (commonly called the "street-pressure chamber") and an eduction-chamber C above, (called the "regulated-pressure chamber,") and D and D' the induction and eduction pipes communicating with these chambers, respectively.

E is the valve, which is formed of inverted-cup shape, with a pendent exterior flange which dips into a mercury bath or seal $b$, held in an annular cup or channel $c$. As the valve E is lifted partly out of the mercury the gas is enabled to pass from the induction-chamber beneath to the eduction-chamber above. Preferably the bottom edge of the pendent flange of the valve is notched or serrated, in order that when the valve is partly opened a series of minute openings will be formed, through which the gas may escape. Preferably, also, the annular cup is corrugated or ribbed on its sides to prevent the whirling of the mercury.

In the upper part of the eduction-chamber is placed a movable diaphragm F, which responds to the varying pressures therein. This diaphragm is preferably constructed as an inverted floating cup, the pendent edges of which are sealed in an annular bath of mercury $d$. The diaphragm or float F is suitably counterweighted by a weight $e$ placed upon it, which weight can be varied in order to vary the pressure of the gas discharged from the eduction side of the regulator. The chamber G above the diaphragm is placed in suitable communication with the atmosphere, preferably by a leakage through the joint $f$, which is not a tight joint. The diaphragm F is connected to the valve E, so that as the diaphragm rises by reason of an increase of pressure in the eduction-chamber it will cause the valve to descend, and thereby cut off more or less the passage of gas into this chamber until the pressure therein is reduced, as is usual in gas-regulators. In my preferred construction this connection is effected through a valve-stem $g$, fixed to the diaphragm F, a lever $h$, jointed to said stem and fulcrumed at $i$ to the casing of the apparatus, a stem or rod $j$, jointed at its upper end to said lever and passing down through the partition $a$, and a rock-lever $k$ in the lower chamber fulcrumed to a support $l$ and jointed at its shorter arm to the rod $j$ and at its longer arm to the rod $m$ of the valve E. As the valve is at the upper end of this latter rod, it is desirable to counterpoise it by attaching a weight $n$ to the lower end of the rod, in order that when the valve is lifted out of the mercury seal $b$, in which when closed it partly floats, the rod shall remain in the upright position and the valve shall be sustained above the mercury. Preferably a similar counter-weight $n'$ is hung from the lower end of the rod $j$ in order to balance the parts. The rod $j$ is sealed or packed where it passes through the partition $a$, which is best done by mounting on the rod an inverted cup or diaphragm H, the pendent flange of which is immersed in a mercury seal $p$. The cup H might be of larger or smaller size; but it is preferably made of such area that the upward pressure against it from the chamber B shall balance the upward pressure against the valve E. Since the lever $k$ has arms of unequal length, the cup H is made in this construction with an area enough greater than that of the valve E to compensate for the disadvantage of leverage through which it acts on the valve.

The gas on passing through the valve E is not at once liberated and free to pass directly into the eduction-pipe, but is confined and caused to ascend through a somewhat tortuous passage, so that the gas is diverted and thereby caused to change its direction once or more in order to disengage from the stream of gas any minute particles of mercury that may have been sprayed or detached from the mercury seal and carried up with it. Preferably I form this tortuous passage by constructing a hood J, of sheet metal, which fits over the cup $c$, holding the mercury seal, and extends upwardly therefrom to a suitable height within the chamber C. To deflect the gas I provide within this hood two or other suitable number of partitions $q\ q'$. The lower partition should be, and the other or others may be, inclined downwardly, so that any particles of mercury which fall upon them may collect and run down the incline, falling onto the valve E, and running thence off from the inclined top surface thereof into the seal. With the construction and proportions shown I find that apparently all of the mercury that is sprayed and carried up with the gas separates itself therefrom before the gas leaves the hood J, so that the mercury is all recovered and restored to the seal $b$. The tortuous passage is desirable chiefly to effect the disengagement of the mercury without the necessity of carrying the hood to too great a height, as it is desirable to avoid enlarging the casing of the regulator. If, however, the hood be constructed of sufficient height and of suitable diameter to enable the gas to pass through it slowly, the mercury particles would be disengaged without the necessity of any deflecting-plates or tortuous passage. This modification is shown in Fig. 5, which will presently be described. In any case the area of the upward passage through the hood will exceed that of the valve-opening. By communicating the motion from the diaphragm F to the valve E through the medium of the cup or float H, its stem $j$, and the lever $k$ beneath, I avoid the passage of the stem of the valve E up through the hood J, which would necessitate the puncturing of the partitions $q\ q'$ for the passage of the valve-stem through them and would involve a current of gas around the stem, which would be liable to carry particles of mercury directly up and might throw them outside of the hood.

In the modified construction shown in Fig. 4 the valve E is arranged to close upwardly against a downturned seat instead of closing downwardly against an up-turned seat. The valve is formed with an annular groove or trough $c'$ to hold the mercury seal $b$, and the hood J is arranged directly over the valve-seat in position to direct into the mercury seal any particles of mercury which may be carried up with the stream of gas. The balancing or compensating cup H is also shown inverted in this figure, being formed with an annular trough to receive the mercury seal $p$.

The rod $j$, passing through this diaphragm, is jointed to one end of a lever $h'$, which is fulcrumed at its middle to a bracket $i$, and the other end of which is jointed to the rod $g$ of the governing-diaphragm F. The rod $j$ connects with the valve-stem $m$ through a lever $k$, fulcrumed on a post $l$, as before. Instead, however, of using the counter-weight $n$ and its counterpoise $n'$, the rods $m$ and $j$ are retained parallel by adding a second lever $k'$ beneath, to which they are pivoted. This construction is not considered so desirable as that first described.

Fig. 5 shows a construction of regulator having a valve which is not balanced and which is best suited for the use of small consumers. The mercury seal is held in an annular groove around the valve-seat and the valve E closes down upon it from above. Its stem $m'$ passes through it and extends upwardly within the chamber C, where it is jointed to a lever $r$, which is connected through a link $s$ to a lever $h'$, the same as that in Fig. 4, to the opposite arm of which the diaphragm-rod $g$ is jointed. The lever $h'$ is of the first order and $r$ of the second order, so that the upward movement of the diaphragm F is converted into a downward movement of the valve E. In lieu of a hood J for receiving the gas as it passes through the valve the eduction-chamber C is formed with a partition J', extending within it to a considerable height, in order that the gas after passing the valve may ascend slowly through a space of large area until it passes over the top of the partition and descends to the eduction-pipe. Since in this construction the upward passage for the gas after it passes the valve is not a tortuous passage, it is necessary to make the passage proportionally of larger area and greater height than in the case of a tortuous passage, so that the stream of gas shall flow upwardly at a slower rate of speed than the particles of mercury will fall, so that they may fall through the rising stream of gas to the bottom of the passage or chamber. The floor or partition $a'$, forming the bottom of the chamber C, is made to slope from all directions toward the mercury bath $b$, so that the mercury disengaged from the gas will be conducted back to the bath. This construction constitutes an equivalent for the hood before described.

Fig. 6 shows a modification of the construction shown in Figs. 1 to 3, wherein the arrangement of a lever and counter-weights beneath the valve and balancing float is avoided. The valve E has its stem $m'$ projecting upwardly and bent to avoid the deflecting-plates $q$ $q'$. At its upper end it is jointed to one arm of a rock-lever $k'$, which is fulcrumed on a projecting post $l'$, and to the other arm of which is hung the rod $j$ of the balancing float or cup H. The rod $g$ of the diaphragm F is connected to the valve through the medium of a lever $h'$, which is fulcrumed to the side of the casing and connected by a link $s'$ to the rock-lever $k'$. In this construction the float H is employed solely for the purpose of balancing the valve against the pressure in the induction-chamber in excess of that in the eduction-chamber. The hood J is in this construction the same as shown in Fig. 1.

My invention may be otherwise modified in structural respects without departing from its essential features. The particular method of communicating motion from the diaphragm F to the valve E is not material, provided it be done in such a way as to not defeat the action of the hood or mercury separator, by which the sprayed or displaced mercury is disengaged and returned to the mercury seal. The construction by means of which the mercury separated from the stream of gas that has passed the valve is returned to the mercury seal may be variously modified, provided it be adapted to accomplish this purpose.

My invention is applicable to valves that are used with other liquids than mercury—such, for example, as glycerine or heavy oils—the proportion of the parts being suitably modified to enable the sprayed particles of such lighter liquids to be separated and recovered from gaseous substances and returned to the liquid seal.

I claim as my invention the following-defined novel features and combinations, substantially as hereinbefore specified, namely:

1. In a gas-pressure regulator, the combination, with the casing, diaphragm, and liquid-sealed valve, of an upward passage for the gas on the eduction side of the valve, of greater area than the valve-opening and formed with its surfaces sloping toward the liquid seal in order to conduct back thereto the disengaged particles of the liquid, substantially as shown and described.

2. In a gas-pressure regulator, the combination, with the casing, diaphragm, and liquid-sealed valve, of an upward passage for the gas on the eduction side of the valve, of greater area than the valve-opening, provided with a hood, as J, substantially as shown and described.

3. In a gas-pressure regulator, the combination, with the casing, diaphragm, and liquid-sealed valve, of a tortuous upward passage for the gas on the eduction side of the valve adapted by the deflection of the stream of gas to disengage therefrom any particles of liquid that may have been carried up thereby from the liquid seal and formed with its surfaces sloping toward said seal to conduct back such particles thereto.

4. In a gas-pressure regulator, the combination, with the casing, diaphragm, and liquid-sealed valve, of a hood arranged over said valve on its eduction side and having deflecting-partitions, whereby is formed a tortuous upward passage from the valve adapted to disengage from the gas and conduct back to the liquid seal any particles of liquid that may have been carried up therefrom by the stream of gas.

5. In a gas-pressure regulator, the combination, with the casing, diaphragm, and liquid-sealed valve, of a hood having deflecting-partitions arranged over said valve on its eduction side, and mechanical connections between the diaphragm and valve extending exterior to said hood.

6. In a gas-pressure regulator, the combination of the casing divided by a partition into an induction-chamber beneath and an eduction-chamber above and having two openings through said partition, a liquid-sealed valve controlling one of said openings, a liquid-sealed cup closing the other opening, a stem passing through and attached to said cup, a mechanical connection between said stem and valve arranged in the induction-chamber and engaging them from beneath, a regulating-diaphragm in the eduction-chamber, and mechanical connections between such diaphragm and cup, whereby the regulating-diaphragm is connected to the valve through the medium of the cup.

7. The combination, to form a gas-pressure regulator, of the casing A, having partition $a$, dividing it into induction and eduction chambers, annular cup $c$ for holding a liquid seal $b$, hood J over said cup, valve E, lever $k$, rod $j$, liquid-sealed cup H, lever $h$, rod $g$, and regulating-diaphragm F, combined and adapted to operate substantially as specified.

In witness whereof I have hereunto signed my name in the presence of two subscribing witnesses.

WILLIAM THRELKELD.

Witnesses:
ARTHUR C. FRASER,
JNO. E. GAVIN.